United States Patent [19]
Onitake et al.

[11] Patent Number: 5,506,948
[45] Date of Patent: Apr. 9, 1996

[54] TOPOLOGY MAINTAINING GEOMETRIC DATA CORRECTING METHOD AND SYSTEM EMPLOYING SAME

[75] Inventors: Miyuki Onitake, Yokohama; Satoshi Kondo, Kawasaki, both of Japan

[73] Assignee: Canon Kabushiki Kaisha, Tokyo, Japan

[21] Appl. No.: 260,266

[22] Filed: Jun. 14, 1994

[30] Foreign Application Priority Data

Jun. 21, 1993 [JP] Japan .................................. 5-149461

[51] Int. Cl.$^6$ ...................................................... G06T 3/00
[52] U.S. Cl. ......................... 395/138; 395/133; 395/919
[58] Field of Search ................................... 395/133–139, 395/919, 155, 160, 161, 140; 348/95; 382/26, 27, 45

[56] References Cited

U.S. PATENT DOCUMENTS 4,991,115  2/1991  Guthrie et al. .......................... 395/117

FOREIGN PATENT DOCUMENTS 0576178  12/1993  European Pat. Off. .
WO90/14641  11/1990  WIPO .

*Primary Examiner*—Almis R. Jankus
*Attorney, Agent, or Firm*—Fitzpatrick, Cella, Harper & Scinto

[57] ABSTRACT

A geometric data correction method is applicable to geometric data-element data comprising a plurality of line segments and circular arcs. When geometric data elements that should originally be interconnected cross or become separated from each other, the offset between geometric data elements is corrected automatically. This saves a great amount of time in comparison with that needed for redrawing of the geometric data elements. The method includes a topology recognition step of recognizing the topology of the geometric data elements, a geometric-parameter alteration step of correcting the offset of geometric data elements by altering geometric parameters, which define each geometric data element, with regard to all geometric data elements while maintaining the topology thereof, and an end-point decision step of deciding end points accompanied by enlargement/reduction of the geometric data elements. The method may further include a parameter-setting step of setting a connection parameter, which is necessary in order to obtain at least the connected state between geometric data elements, and a maximum amount of alteration of the geometric parameters of the geometric data elements, or an error-information output step of outputting error information generated at the geometric-parameter alteration step.

12 Claims, 13 Drawing Sheets

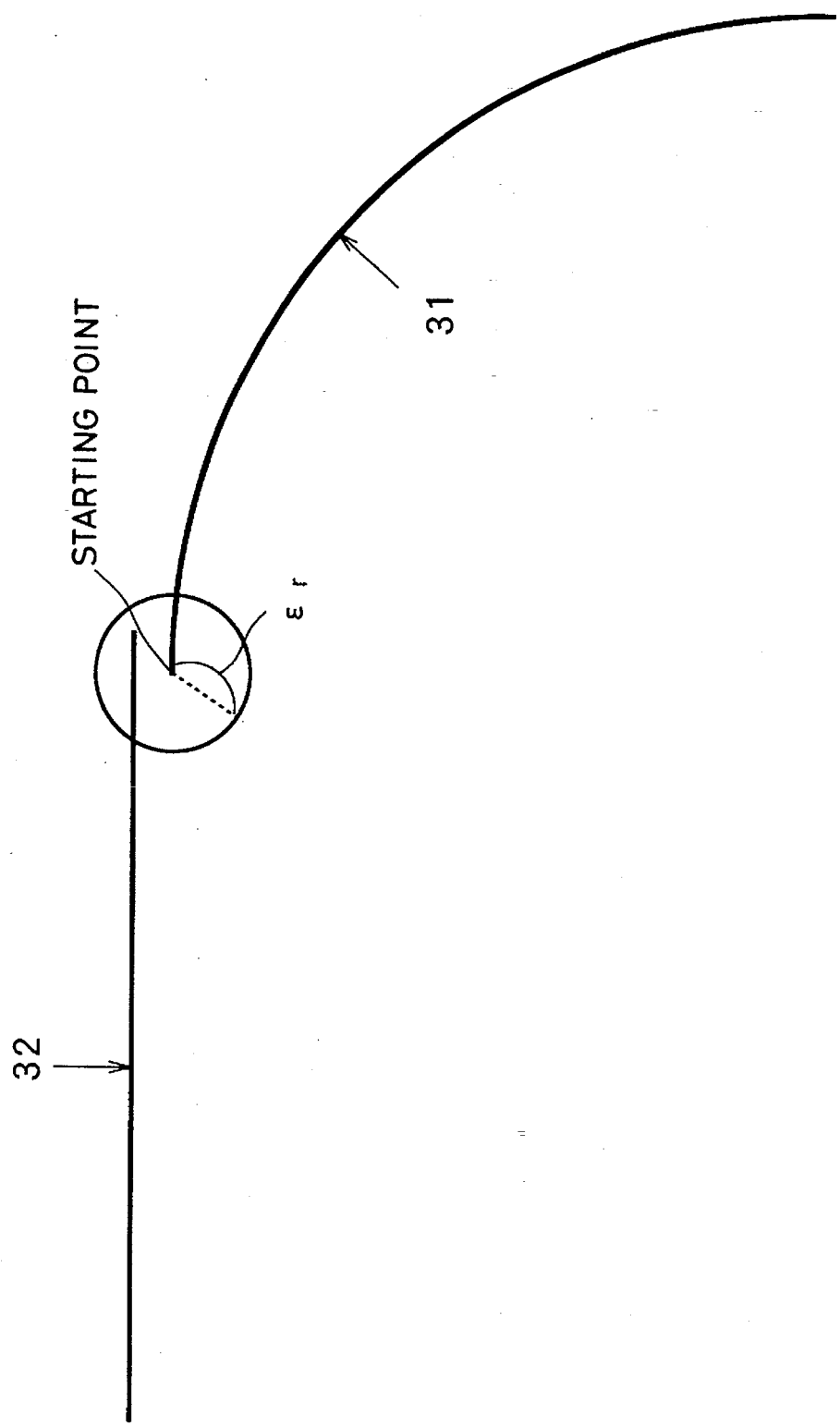

1

TOPOLOGY MAINTAINING GEOMETRIC DATA CORRECTING METHOD AND SYSTEM EMPLOYING SAME

BACKGROUND OF THE INVENTION

1. Field of the Invention

This invention relates to a geometric data correction method through which an offset between geometric data elements as created by a CAD system or the like can be corrected automatically, as well as to a system employing this method.

2. Description of the Related Art

When graphics elements that should originally be interconnected in graphics as created by a CAD system become separated from each other owing to a computer calculation error or as the result of human error, it is necessary to redraw the graphics elements because they cannot be traced automatically as at the time of closed-loop creation. Since this offset is extremely small, it is very difficult to visually ascertain the locations that should be corrected. Moreover, graphics elements that should be corrected are fairly numerous and correcting them requires an enormous amount of time.

Though there are systems having a correction function for connecting separated graphics elements, these systems merely determine the point of intersection between graphics elements and adopts this position as the point of connection. As a result, it is impossible to deal with cases in which a point of intersection cannot be calculated.

SUMMARY OF THE INVENTION

Accordingly, an object of the present invention is to provide a graphics correction method, and a system employing this method, in which an offset between graphics elements can be corrected automatically.

Another object of the present invention is to provide a graphic correction method, and a system employing this method, in which error information at the time of correction is communicated to make possible judgment of the suitability of a correction or to enable correction by the operator.

In order to solve the foregoing problems, the present invention provides a graphic correction method in which a graphic is composed of a plurality of graphic elements such as line segments and circular arcs, comprising a topology recognition step of recognizing the topology of the graphic elements, a geometric-parameter alteration step of correcting offset of graphic elements by altering geometric parameters, which define each graphic element, with regard to all graphic elements while maintaining the topology, and an end-point decision step of deciding an end point accompanied by enlargement/reduction of graphic elements. The method further includes a parameter-setting step of setting a connection parameter, which is necessary in order to obtain at least a connected state between graphic elements, and a maximum amount of alteration of the geometric parameters of the graphic elements, wherein the topology is recognized using the connection parameter at the topology recognition step and the geometric parameters are altered within the maximum amount of alteration of the geometrical parameters at the geometric-parameter alteration step.

In order to solve the foregoing problems, the present invention further provides a graphic correction method in which a graphic is composed of a plurality of graphic elements such as line segments and circular arcs, comprising a topology recognition step of recognizing the topology of the graphic elements, a geometric-parameter alteration step of correcting offset of graphic elements by altering geometric parameters, which define each graphic element, with regard to all graphic elements while maintaining the topology, an end-point decision step of deciding an end point accompanied by enlargement/reduction of graphic elements, and an error-information output step of outputting error information generated at the geometric-parameter alteration step. The method further includes a parameter-setting step of setting a connection parameter necessary in order to obtain a connected state between graphic elements and a maximum amount of alteration of the geometric parameters of the graphic elements, wherein the topology is recognized using the connection parameter at the topology recognition step and error information is generated in a case where an alteration of geometric parameters exceeds the maximum amount of alteration of the geometrical parameters at the geometric-parameter alteration step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram for describing a connection decision in this embodiment;

DESCRIPTION OF THE PREFERRED EMBODIMENTS

Preferred embodiments of the present invention will now be described in detail.

Figure 1:
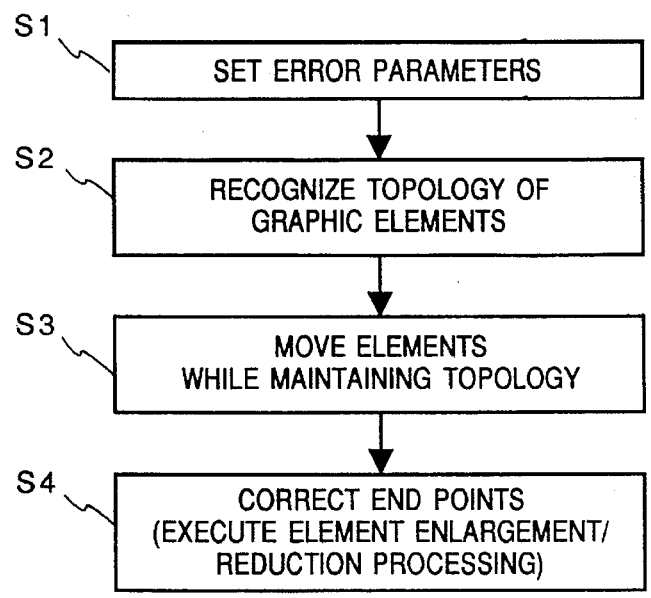
FIG. 1 is a flowchart illustrating the basic processing procedure of the present invention.

FIG. 1 is a flowchart for describing the processing procedure of a first embodiment of the graphic correction method according to the present invention. Basically, the flowchart comprises an error-parameter setting step S1, a topology recognition step S2, a geometric-parameter alteration step S3 and an enlargement/reduction step S4.

Figure 2:
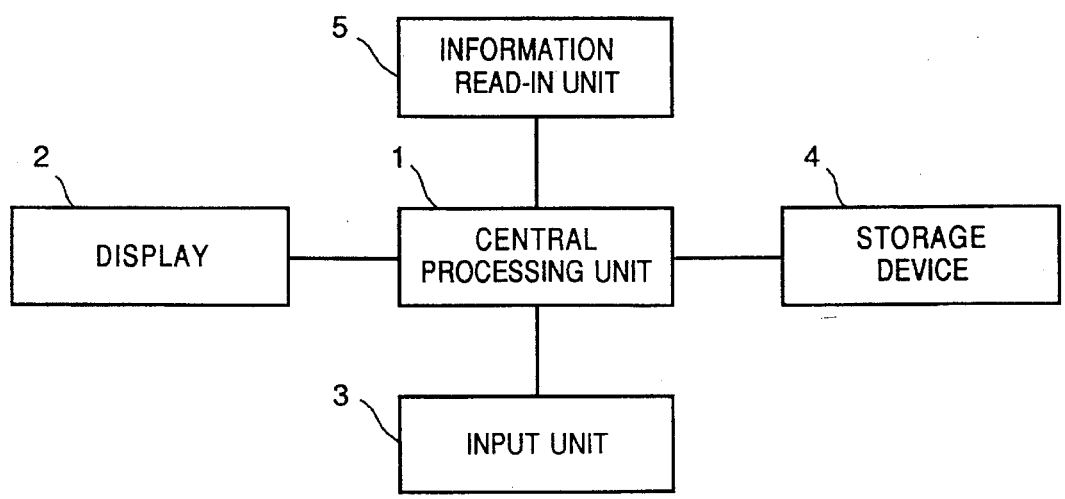
FIG. 2 is a conceptual view of hardware constituting an apparatus for executing the processing of this embodiment.

FIG. 2 is a conceptual view of hardware for executing the operational procedure illustrated in the flowchart of FIG. 1. The hardware includes a central processing unit 1 for executing calculations, decisions and the like, a display unit 2 such as a CRT for displaying graphic-element data, an input unit 3 such as a key, mouse and the like, a storage device 4 such as a magnetic disk or a memory, and an information read-in device 5, such as a magnetic tape device or network device, for reading in data, programs, etc. A part of the data or programs is stored in the storage device 4 in advance. Though not described in this embodiment, it is assumed that a well-known program for creating graphics and/or moving the same, as is employed in CAD/CAM or the like, has already been loaded.

The details of processing will now be described. The processing for calculations and decisions from step S1 to step S4 is assumed to be executed by the central processing unit 1 shown in FIG. 2.

(Setting of error parameters)

Error parameters are set at step S1. The error parameters are constituted by an amount $\epsilon_r$ of connection error used as a reference when it is judged that two graphic elements are connected from the start, an amount $\epsilon_t$ of joining error used as a reference when it is judged that two graphic elements to be connected are in tangential contact, and an amount of maximum alteration of geometric parameters that determines the upper limit when geometric parameters of graphic elements are altered. The graphic elements mentioned here are individual graphics such as line segments, circular arcs, ellipses, etc. Further, in the case of a circular arc, for example, the geometric parameters correspond to the coordinates of the center of the arc, the radius of the arc, etc., which are necessary in order to define the arc mathematically. As for the maximum amount of alteration, assume, in the example of the circular arc, that the radius can be altered over a range of the radius ±α. In such case, α will be referred to as the maximum amount of alteration.

Accordingly, a plurality of geometric parameters generally exist for each category (line segment, circular arc, etc.) of graphic element, and a maximum amount of alteration also is set for each geometric parameter. Methods of setting the error parameters include a method of entering the error parameters using the input device 3 shown in FIG. 2, a method of storing the error parameters in the storage device 4 of FIG. 2 beforehand and then subsequently reading these parameters out of the storage device, and a method of reading in the error parameters from the information read-in device 5, such as the aforementioned magnetic tape device or network device, shown in FIG. 2.

(Recognition of topology)

At step S2, all graphic-element data of interest is read into the storage device 4 of FIG. 2 from the storage device 4 or information read-in device 5 shown in FIG. 2, and topology information of all graphic elements is created in the storage device 4. The topology information mentioned here refers to information indicating which graphic elements are connected together and in what fashion.

In order to obtain information which graphic elements are connected together, attention is focused upon a certain graphic element, consideration is given to a circle of radius $\epsilon_r$, set at step S1, from any point on this graphic element, and it is decided that other graphic elements present inside the circle are to be connected, thereby obtaining the above-mentioned information. FIG. 3 illustrates an example in which, when attention is directed to the starting point of a circular arc 31, it is judged that the circular arc 31 and a line segment 32 are to be connected because the line segment 32 is present within a circle of radius $\epsilon_r$, whose center is the starting point of the circular arc 31.

Figure 4A:
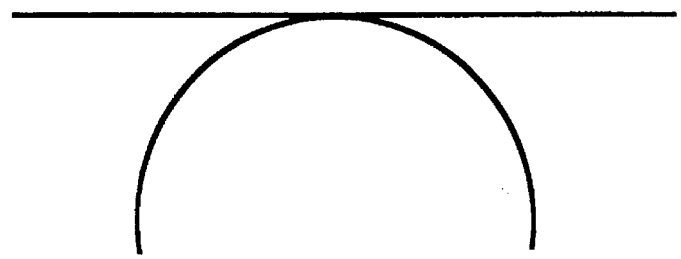
FIGS. 4A to 4C are diagrams showing several examples of connected states.
Figure 4B:
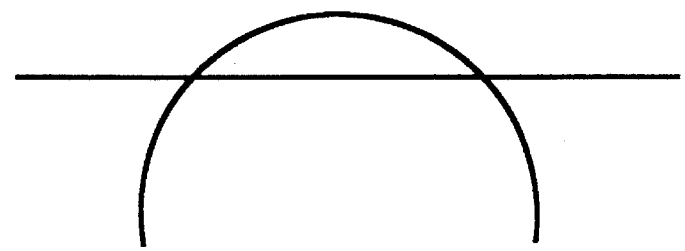
Figure 4C:
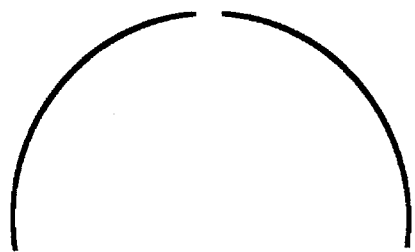
Figure 5:
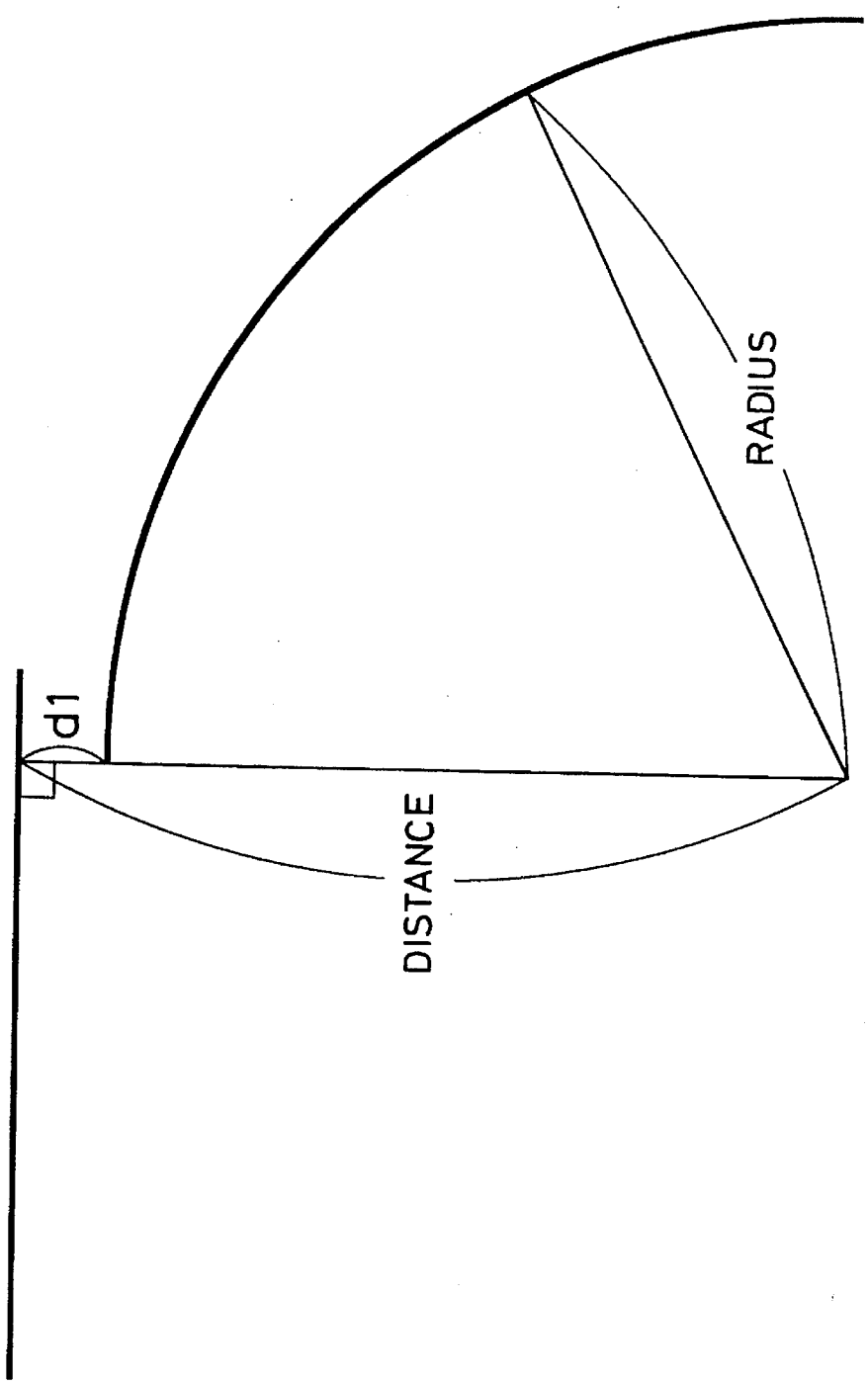
FIG. 5 is a diagram for describing a decision regarding connected states in this embodiment.
Figure 6:
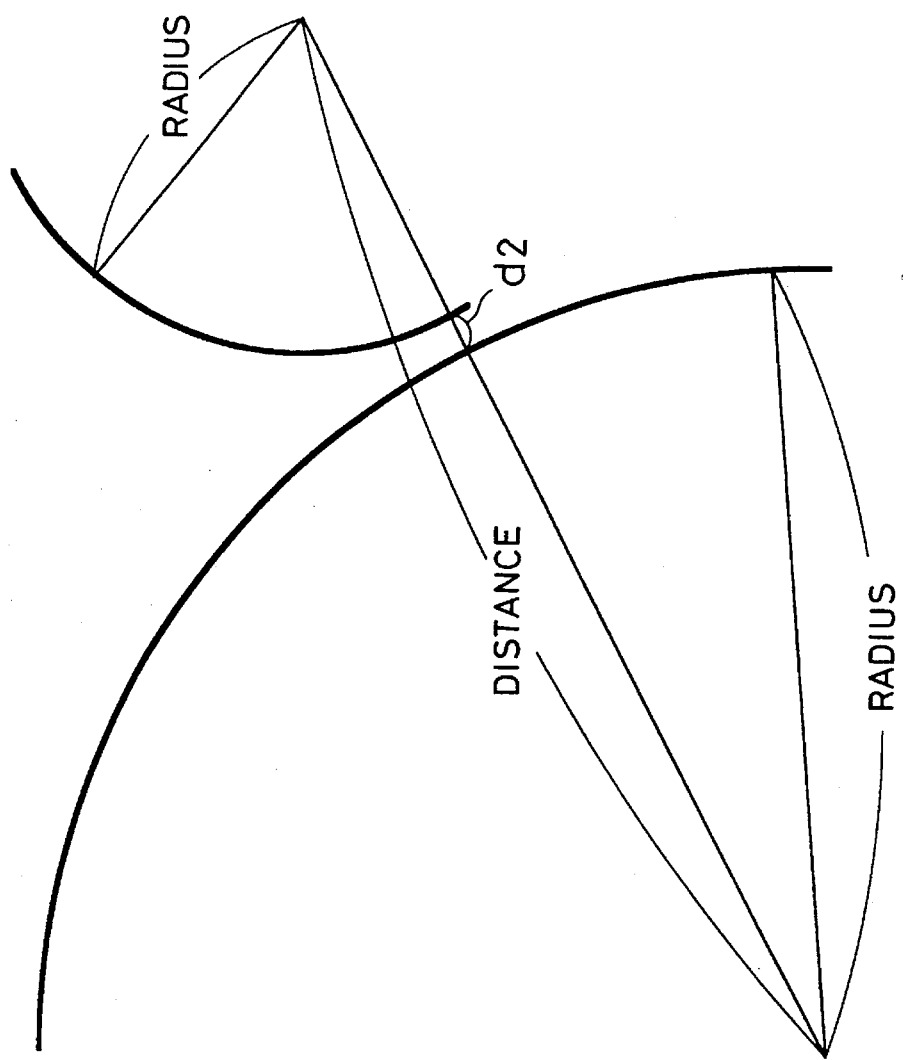
FIG. 6 is a diagram for describing a decision regarding the connected states in this embodiment.

With regard to how graphic elements are connected, three types of connections are conceivable, as shown in FIGS. 4A to 4C. Specifically, there is tangential contact, as shown at FIG. 4A; intersection, as shown at FIG. 4B; and a case in which graphic elements having identical geometric parameters are continuous, as shown at FIG. 4C. As for a method making this judgment, consider the case of a circular arc and a line segment. As shown in FIG. 5, a perpendicular is dropped from the center of the circular arc onto the line segment to be connected, and the difference d1 between the distance from the center of the circular arc to the line segment and the radius of the circular arc is determined. In the case of two circular arcs, as depicted in FIG. 6, the difference d2 between the sum of the radii and the distance between the centers of the two circular arcs is found. When d1 or d2 fall within $\epsilon_t$ set at step S1, it is judged that the two graphic elements are in tangential contact. Conversely, when either d1 or d2 is greater than $\epsilon_t$ set at step S1, it is judged that they are intersecting.

Figure 7:
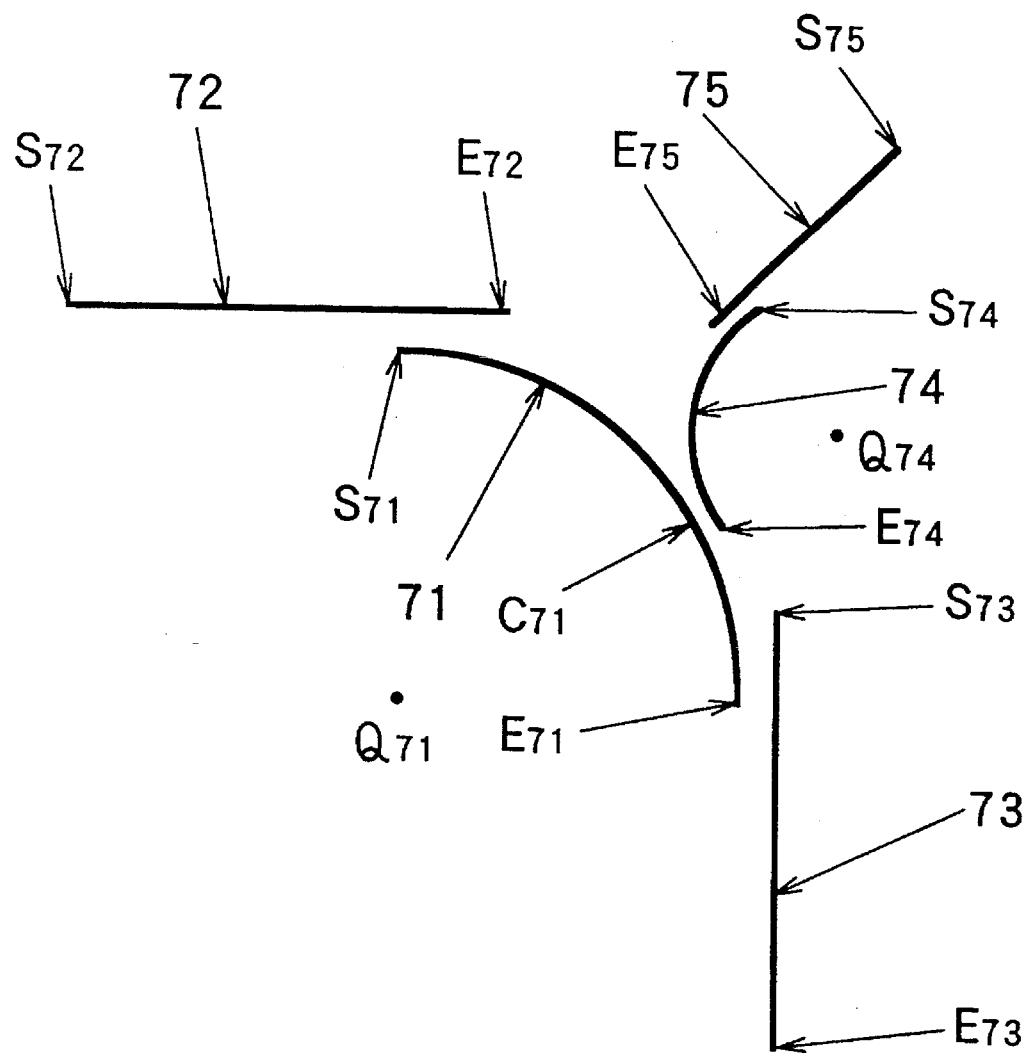
FIG. 7 is a diagram illustrating an example of a graphic processed in this embodiment.
Figure 8:
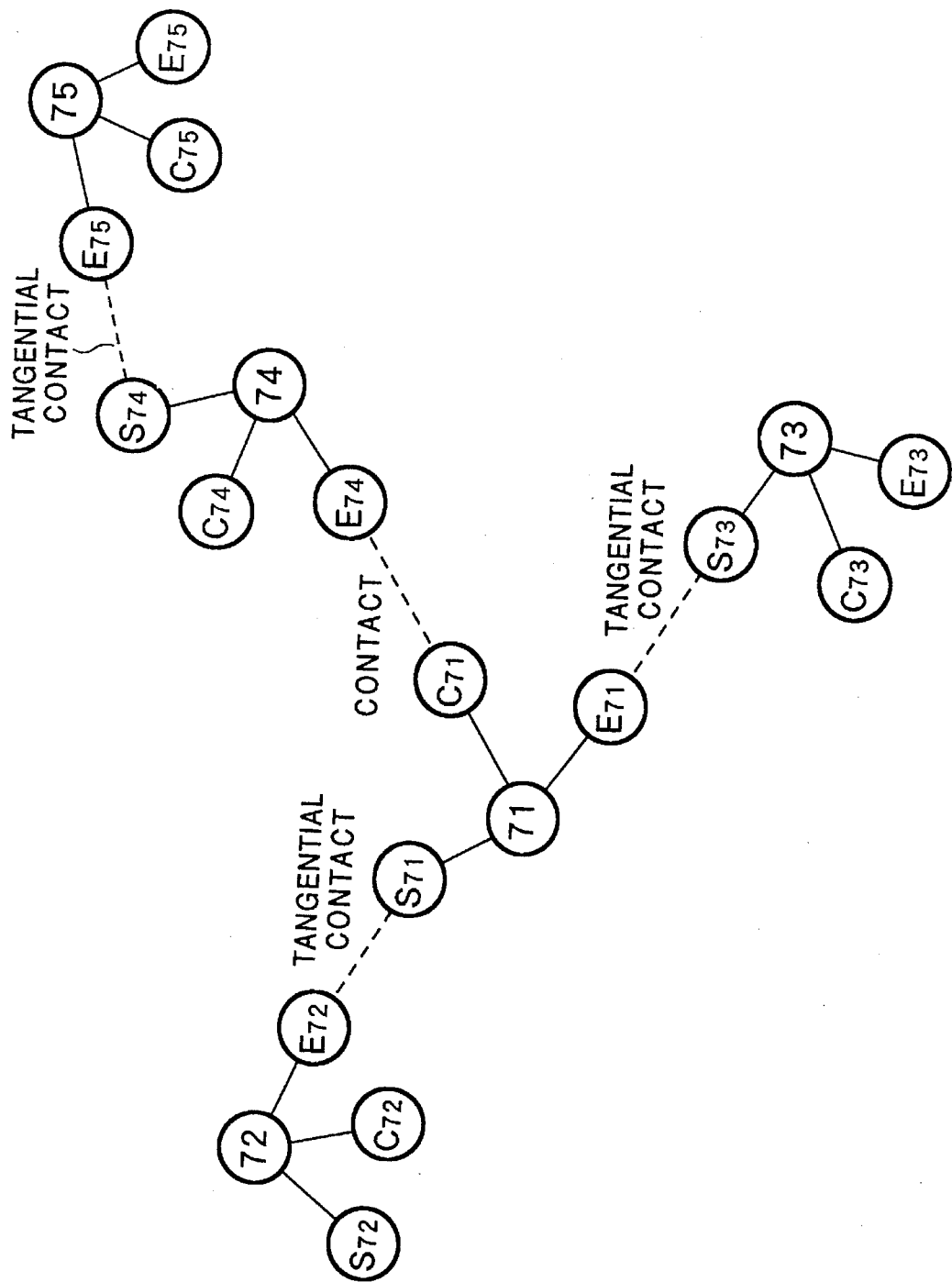
FIG. 8 is a conceptual view of topology information obtained by recognizing topology.

FIG. 7 is a graphic composed of two circular arcs and three line segments. For example, consider circular arc 71. Here it is judged that the circular arc 71 tangentially contacts an end point $E_{72}$ of a line segment 72 at its starting point $S_{71}$, tangentially contacts a starting point $S_{73}$ of a line segment 73 at its end point $E_{71}$ and tangentially contacts an end point $E_{74}$ of a circular arc 74 at a central point $C_{71}$. Topology information regarding all graphic elements is thenceforth obtained in the same manner. FIG. 8 is a conceptual view of topology information, obtained at step S2, with regard to the example shown in FIG. 7. Numerals 71 ~75 in FIG. 8 represent the numbers of the graphic elements in FIG. 7, $S_n$ represents the starting-point side of a graphic element number n, $E_n$ represents the end-point side of a graphic element number n and $C_n$ represents a point located generally at the center off a graphic element number n. Thus, $S_{73}$ represents the starting point of the graphic element 71, $E_{71}$ the end point of the graphic element 71 and $C_{71}$ the central point of the graphic element 71. The term "connected" in FIG. 8 indicates that the two graphic elements tangentially contact each other at the points represented.

(Altering of geometric parameters)

Geometric parameters of all graphic elements are altered at step S3, on the basis of the topology information obtained at step S2, within the amount of maximum alteration of geometric parameters set at step S1, and the graphic-element data read in the storage device 4 of FIG. 2 at step S2 is corrected. The purpose of this is to prevent a situation in which calculation of a point of intersection is made impossible by an error when the end point of a graphic element is determined at step S4.

The details of the procedure of step S3 will now be described taking the group of graphic elements shown in FIG. 7 as an example.

FIG. 7 illustrates a case in which graphic elements are composed of three line segments and two circular arcs. However, in case of a graphic representing a mechanical part, for example, there is a possibility that a line segment represents a reference plane which is for stipulating dimensions. On the other hand, since a cylindrical surface represented by a circular arc is more difficult to measure than a plane, often dimensional accuracy of a cylindrical surface is required less than that of a plane. Accordingly, even if alteration of a geometric parameter such as the slope of a line segment is allowed within the range of the maximum amount of alteration, it is desired that the geometric parameters of the line segment not be altered to an extreme degree. For this reason, here alteration of geometric parameters of graphic elements other than line segments is given priority over alteration of geometric parameters of line segments when alteration is made.

Figure 9:
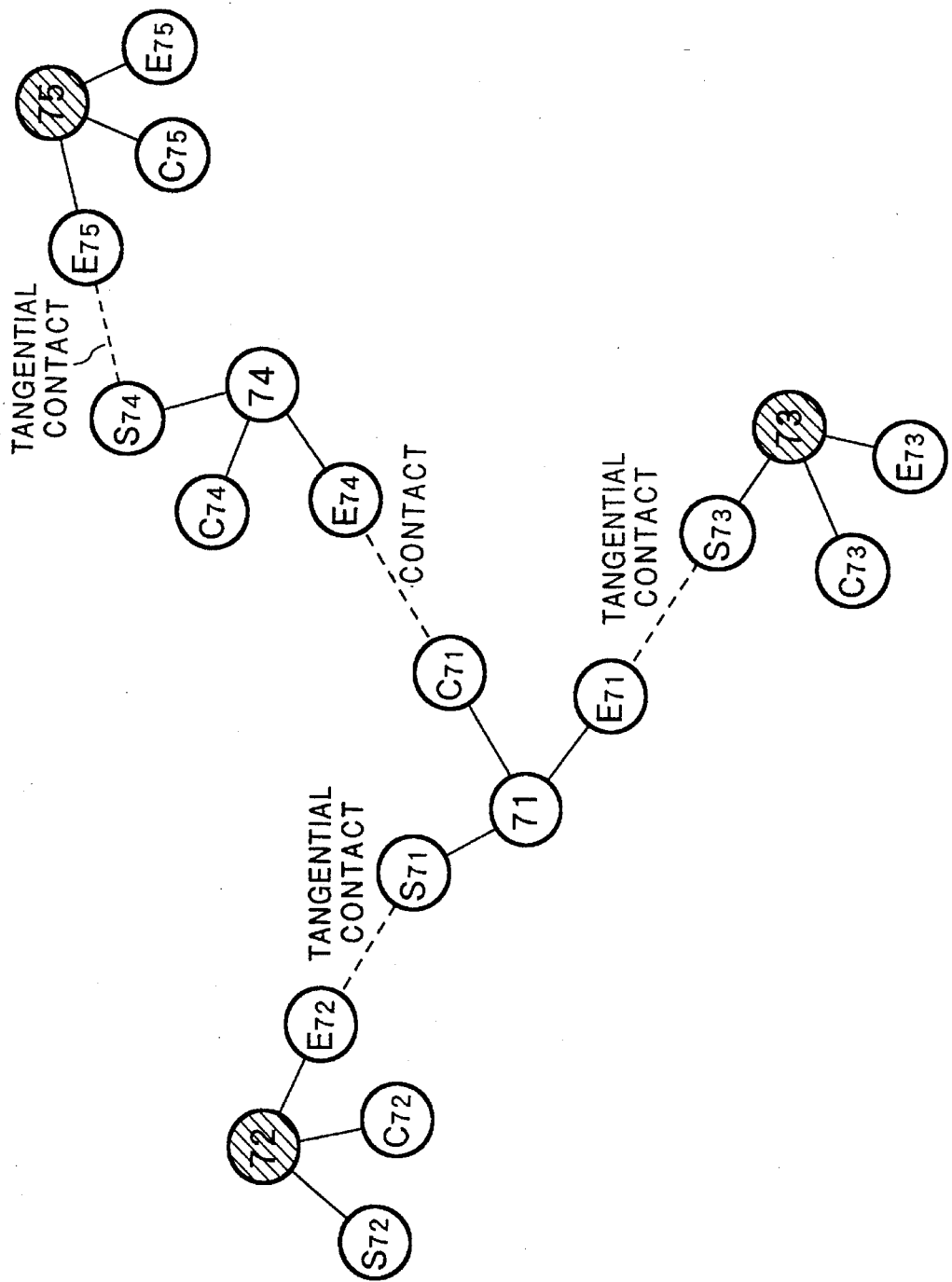
FIG. 9 is a diagram showing a case in which straight lines in FIG. 8 have been processed.

In order to control the processing of step S3, a flag is set, for each and every graphic element, in the storage device 4 shown in FIG. 2. The flag represents whether alteration of a geometric parameter has ended normally, whether the alteration has not ended normally or whether the alteration processing has not yet been carried out. For the sake of description, let the flag values be "1" for "normal", "−1" for "abnormal" and "0" for "not yet processed". Further, in order to give priority to the processing of graphic elements other than line segments, all flags of line segments initially are made "1" for the sake of convenience. FIG. 9 is a conceptual view of the topology information of the group of graphic elements shown in FIG. 7. Though FIG. 9 is similar to FIG. 8, here the graphic element numbers are shaded to indicate that the flags of the graphic elements having these numbers are "1".

It will be understood from FIG. 9 that the circular arc 71 tangentially contacts the line segments 72, 73 and circular arc 74. The flag for the circular arc 74 is "0" and the possibility that the geometric parameters thereof will be modified in the future is high. It will suffice therefore to decide the geometric parameters of the circle containing the circular arc 71 in such a manner that it will tangentially contact the straight line containing the line segment 72, whose flag is "1", and the straight line containing the line segment 73, whose flag is "1". The reason for considering the line segment as a straight line and the circular arc as a circle is that although the line segment and circular arc can be defined once the end points thereof are decided, in this embodiment the decision regarding the end points is not made until step S4 and, hence, the end points are as yet indeterminate at step S3.

In a case where a circle tangent to two straight lines is obtained and the two straight lines are non-parallel, as in this example, the radius of the circle tangent to these straight lines can be obtained as an arbitrary value and therefore it is not especially necessary to change the radius. Accordingly, here the radius is taken to have a value identical with that of the circular arc 71 and the coordinates of the center need only be calculated. Though a plurality of circles of fixed radii tangential to two straight lines are decided by adopting different center-point coordinates as the result of calculation, the center-point coordinates closest to center-point coordinates $Q_{71}$ of the circular arc 71 are selected from the plurality of coordinates and the selected coordinates are adopted as an altered geometric parameter of the circular arc 71.

Figure 10:
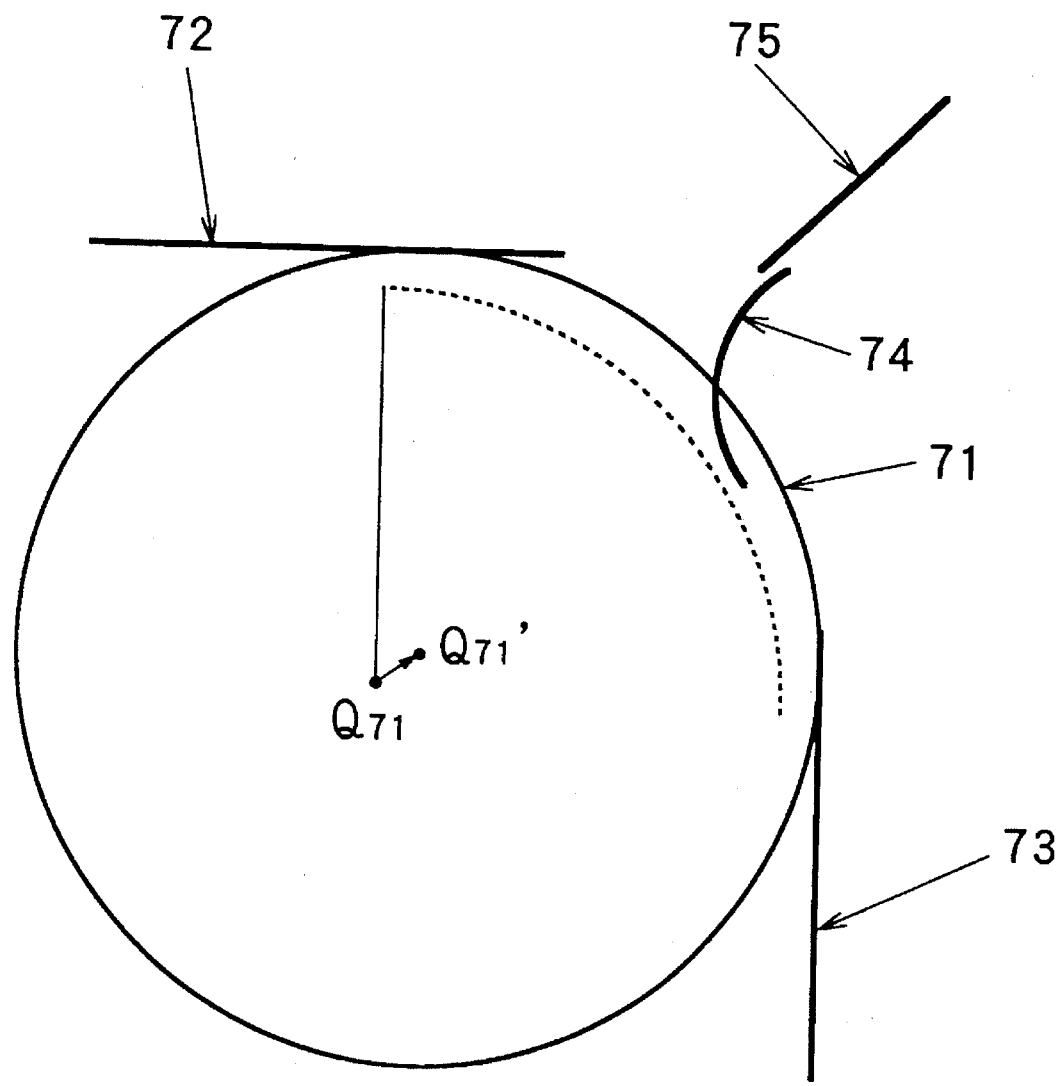
FIG. 10 is a diagram in which a circular arc 71 has been corrected so as to tangentially contact line segments 72, 73.

FIG. 10 illustrates the manner in which this correction is made. In a case where the distance between the original center coordinates $Q_{71}$ and newly found center coordinates $Q_{71}'$ has become greater than the maximum amount of alteration of the geometric parameter for the center coordinates of the circular arc set at step S1, it is construed that the circular arc 71 could not be altered normally. As a consequence, the value of the flag corresponding to the circular arc 71 is made "−1". In a case where the aforementioned distance falls within the maximum amount of alteration, it is construed that the circular arc could be altered normally, and the flag is made "1". The center coordinates of the circular arc 71 in the graphic-element data that has been read in the storage device 4 is updated to the new center coordinates $Q_{71}'$.

Figure 11:
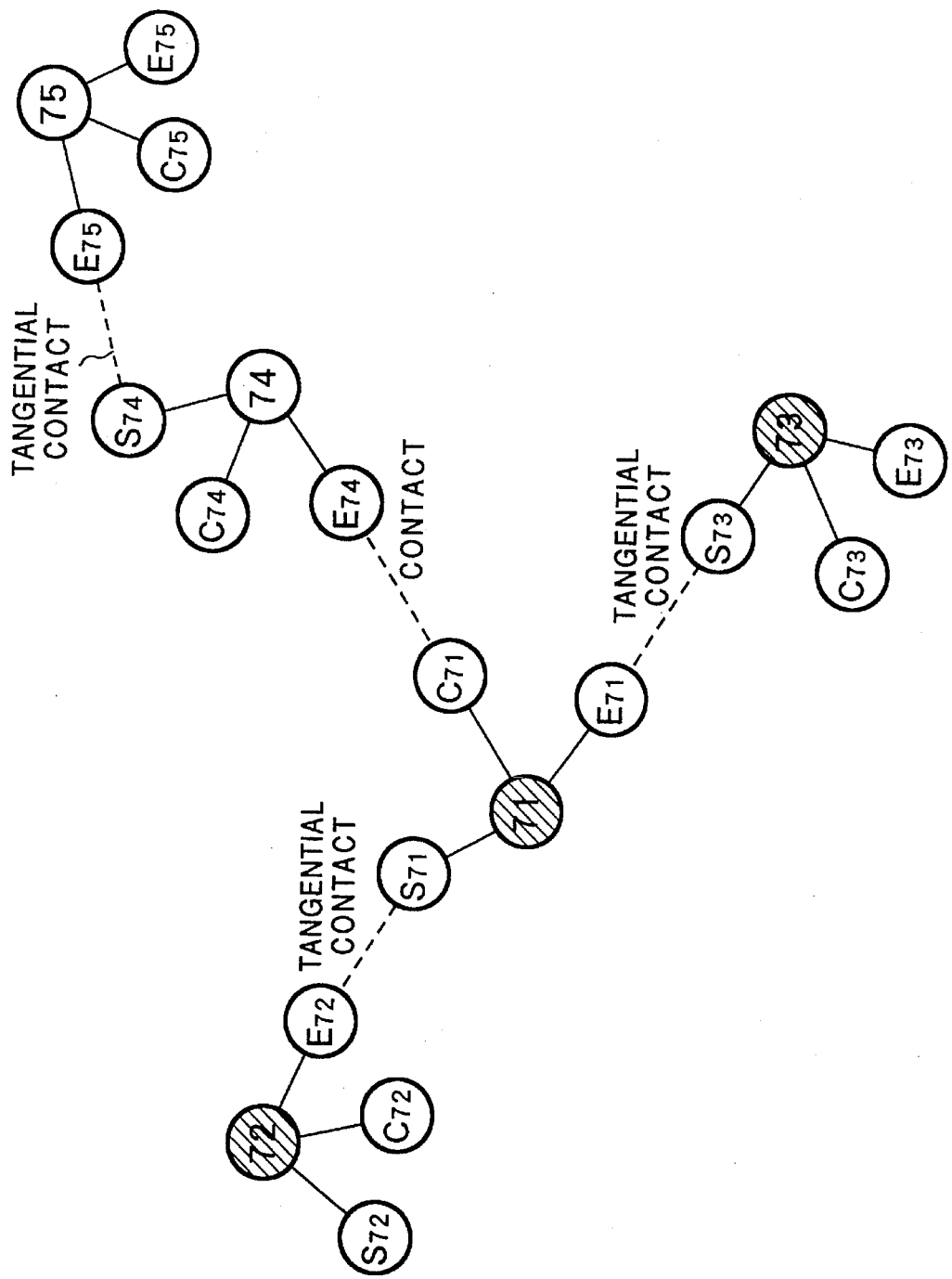
FIG. 11 is a conceptual view of topology information at the time of the correction of FIG. 10.

FIG. 11 is a conceptual view of topology for a state in which the geometric parameters of the circular arc 71 have been altered normally. In will be understood from FIG. 11 that the circular arc 74 tangentially contacts the circular arc 71 and the line segment 75, and that the flags of the circular arc 71 and the line segment 75 are both "1". Accordingly, by finding a circle tangential to a circle containing the circular arc 71 and to a straight line containing the line segment 75, the center coordinates $Q_{74}'$ are adopted as the altered geometric parameter of the circular arc 74. In this case also the radius need not be altered and may be left as is in the same manner as in the case of the circular arc 71.

Figure 12:
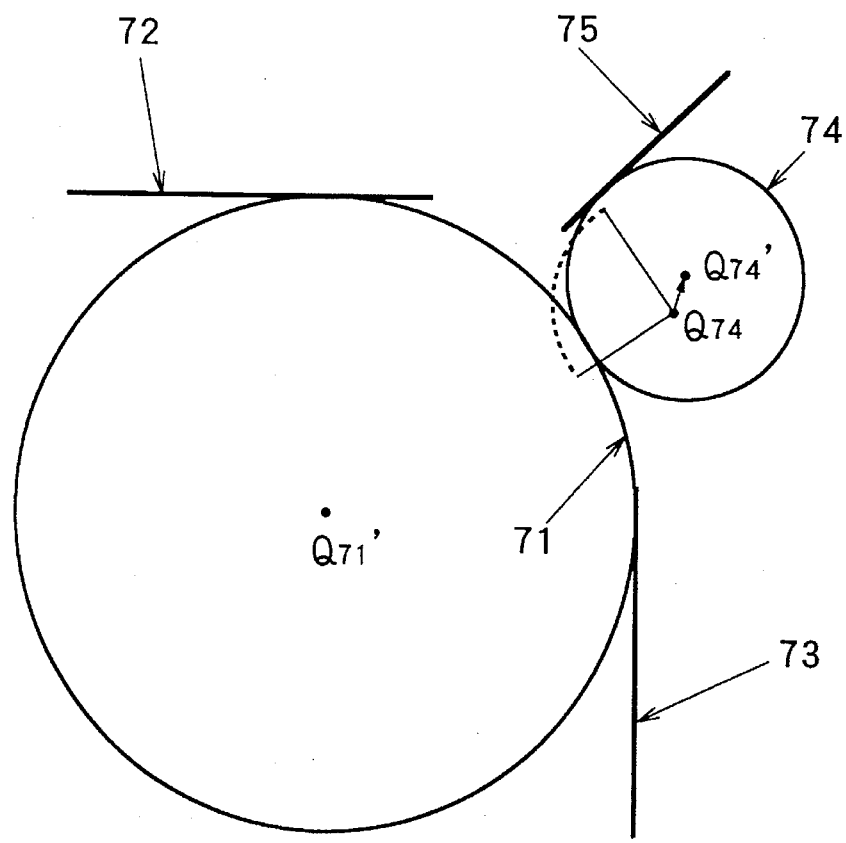
FIG. 12 is a diagram in which a circular arc 74 has been corrected so as to tangentially contact the corrected circular arc 71 and a line segment 75.

FIG. 12 illustrates the manner in which this correction is made. The check for altering geometric parameters, the flags and the updating of the graphic-figure data are carried out in the same manner as in the case of the circular arc 71. Since this alters the geometric parameters of the circular arc 74, the result is that the geometric parameters of all graphic elements in FIG. 7 are decided. It should be noted that if the flag of the circular arc 71 is "−1" when the circular arc 74 is processed, it is construed that the geometric parameters of the circular arc 74 also could not be found normally by this processing. It is possible, therefore, either to make the flag of circular arc 74 "−1" or to ignore the circular arc 71 and find one in such a manner that the circular arc 74 will tangentially contact the line segment 5.

Thus, as described above, a graphic element whose flag is "1", namely a graphic element whose geometric parameters have been determined, is selected from among other graphic elements that decide the geometric parameters of the graphic element, the geometric parameters of a graphic element of interest are determined based upon the selected graphic element, and this processing is repeated until all of the graphic elements are finished.

Furthermore, according to this embodiment, two examples are described, namely one in which a circle is tangent to two straight lines and one in which a circle is tangent to a straight line and a circle. However, there are various other cases as well, such as one in which a circle is tangent to two circles, one in which a circle is tangent to three straight lines, one in which a circle passes through a fixed point and is tangent to two circles, etc. These cases may be distinguished from one another using the conceptual view of topology shown in FIG. 8. Further, according to this embodiment, alteration of graphic elements other than line segments is given precedence over alteration of line segments. However, depending upon the nature of the graphic, it is possible to give alteration of line segments precedence over alteration of other graphic elements.

Figure 13:
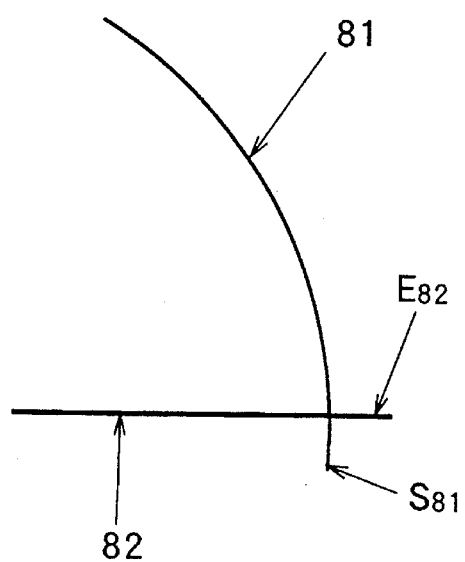
FIG. 13 is a diagram for describing a case in which a circular arc and a line segment cross.

FIG. 13 shows an example in which it is not particularly necessary to alter geometric parameters at step S3. In FIG. 13, a circular arc 81 and a line segment 82 are judged at step S2 to intersect each other. That is, the starting point $S_{81}$ of the circular arc 81 is found to cross the end point $E_{82}$ of the line segment 82. In this case, end-point calculation is possible at step S4 without altering the geometric parameters of the circular arc 81. Accordingly, the flag of the circular arc 81 is merely set to "1" at this step, and alteration of the geometric parameter is not carried out.

(End-point correction: enlargement/reduction of graphic elements)

Figure 14:
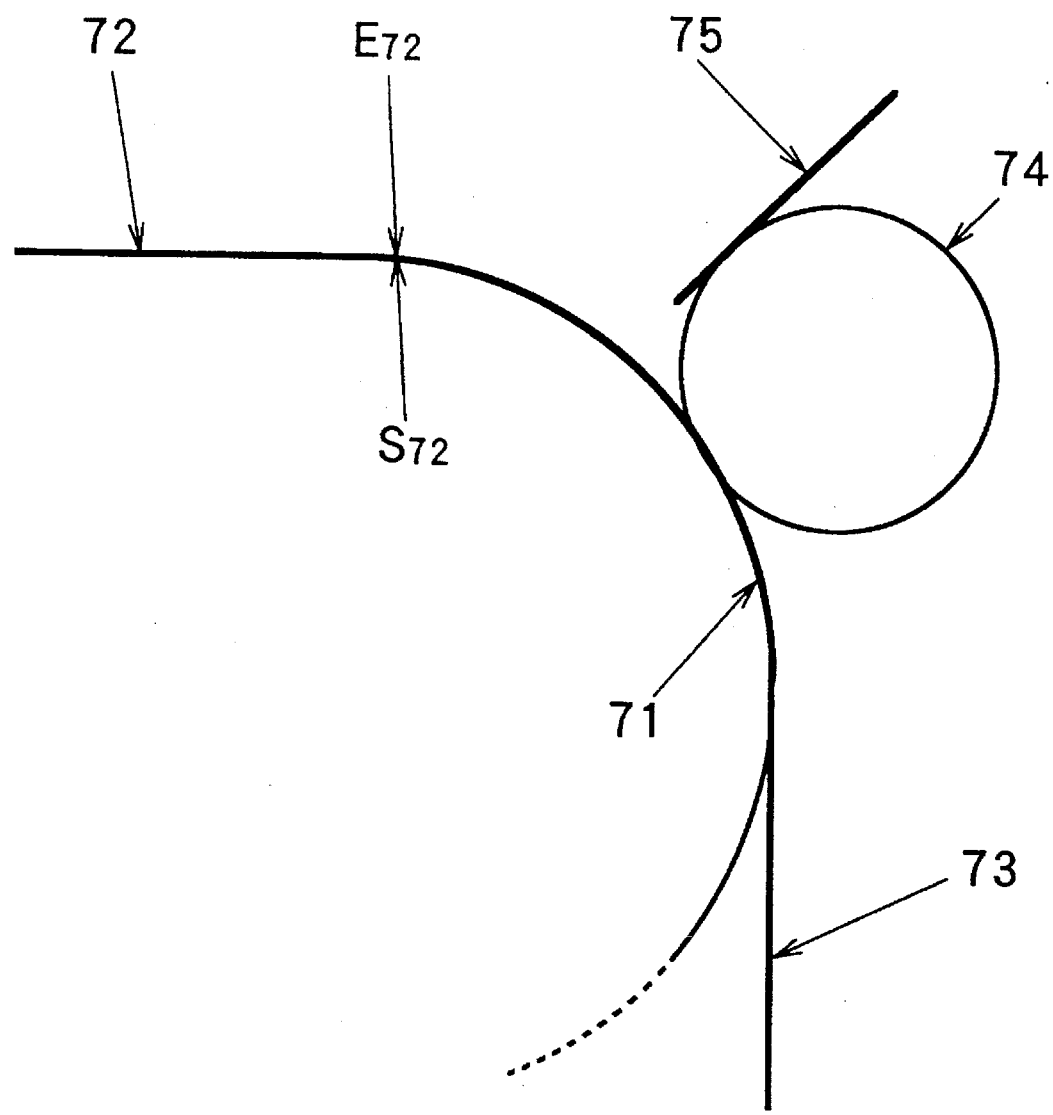
FIG. 14 is a diagram for describing processing for correcting an end point.

End points of all graphic elements altered at up to the preceding step are decided at step S4 by obtaining the point of intersection between graphic elements to be connected. In FIG. 8, first the circular arc 71 is taken as the graphic element of interest. It will be understood that the graphic element connected to the starting-point side $S_{71}$ is the end-point side of the line segment 72. Accordingly, the point of intersection between the circle containing the circular arc 71 and the straight line containing the line segment 72 is obtained and this point is made $S_{71}$. When $S_{71}$ has been determined, $E_{72}$ can be decided as coordinates identical with those of $S_{71}$. This is illustrated in FIG. 14.

The end points of all graphic elements are thus decided and the graphic data in the storage device 4 shown in FIG. 2 is updated. When the end points of all graphic elements have been decided, the graphic data in the storage device 4 is outputted to a predetermined location (in the storage device 4 or in another device through the intermediary of the information read-in device 5, such as a network connecting device). The processing of step S4 is then concluded.

[Other embodiment]

Figure 15:
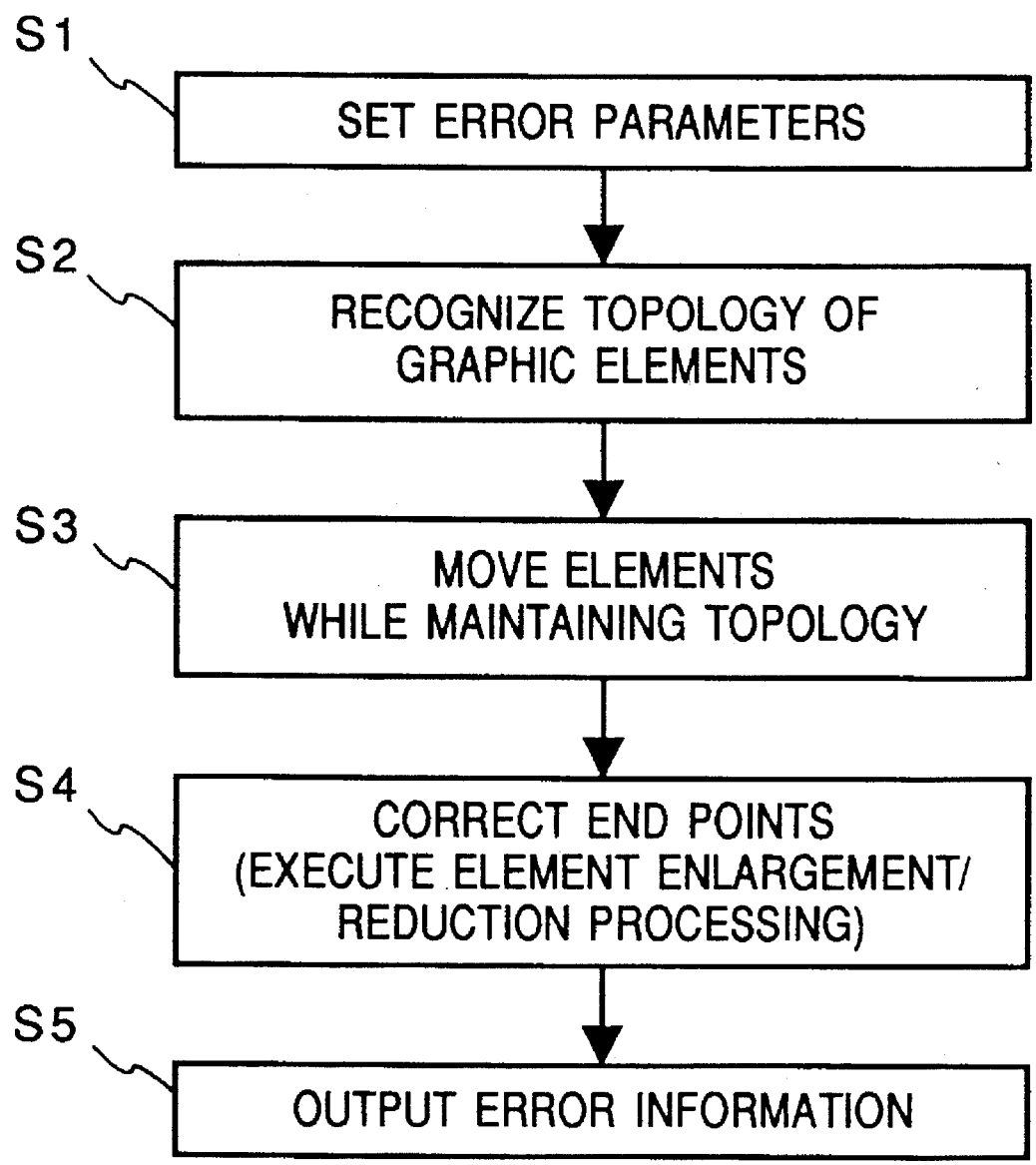
FIG. 15 is a flowchart illustrating a processing procedure according to another embodiment.

FIG. 15 is a flowchart illustrating the processing procedure of a second embodiment. Here steps S1 to S4 are identical with steps S1 to S4 in the first embodiment and need not be described again.

(Display of error information)

This flowchart includes a step S5, at which error information indicative of a graphic element that could not be altered normally at step S3, namely a graphic element whose flag is "−1" in this example, is outputted to the display device or storage device 4 shown in FIG. 2. If this arrangement is adopted, only an erroneous graphic element is redrawn by utilizing this information. As a result, correction of all graphic-element data can be carried out.

The present invention can be applied to a system constituted by a plurality of devices or to an apparatus comprising a single device. Furthermore, it goes without saying that the invention is applicable also to a case where the object of the invention is attained by supplying a program to a system or apparatus.

Thus, present invention makes it possible to provide a graphic correction method for automatically correcting offset between graphic elements. Further, the present invention makes it possible to provide a graphic correction method, and a system employing this method, in which error information at the time of correction is communicated to make possible judgment of the suitability of a correction or to enable correction by the operator.

More specifically, when graphic elements that should originally be interconnected cross or become separated from each other in graphic-element data comprising a plurality of line segments and circular arcs, the offset between graphic elements is corrected automatically. This saves a great amount of time in comparison with that needed for redrawing.

As many apparently widely different embodiments of the present invention can be made without departing from the spirit and scope thereof, it is to be understood that the invention is not limited to the specific embodiments thereof except as defined in the appended claims.

What is claimed is:

1. A geometric data correction method in which a graphic is composed of a plurality of graphic elements such as line segments and circular arcs, comprising:

a parameter setting step of setting, at least, a connection parameter usable to obtain connected states between graphic elements and a maximum amount of alteration of geometric parameters of graphic elements;

a topology recognition step of recognizing the topology of the graphic elements by using the connection parameter;

a geometric-parameter alteration step of correcting offset of graphic elements by altering geometric parameters, which define each graphic element, within the maximum amount of alteration of geometric parameters, with regard to necessary graphic elements while maintaining the topology; and an end-point decision step of deciding an end point accompanied by enlargement or reduction of graphic elements.

2. The method according to claim 1, wherein at said geometric-parameter alteration step, alteration of the geometric parameter of graphic elements other than line segments is performed prior to alteration of the geometric parameter of line segments.

3. A geometric data correction method in which a graphic is composed of a plurality of graphic elements such as line segments and circular arcs, comprising:

a topology recognition step of recognizing the topology of the graphic elements;

a geometric-parameter alteration step of correcting offset of graphic elements by altering geometric parameters, which define each graphic element, with regard to all graphic elements while maintaining the topology;

an end-point decision step of deciding an end point accompanied by enlargement or reduction of graphic elements; and an error-information output step of outputting error information indicative of graphic elements with offset which have not been normally altered at said geometric-parameter alteration step.

4. The method according to claim 3, further comprising a parameter-setting step of setting a connection parameter, which is usable in order to obtain at least a connected state between graphic elements, and a maximum amount of alteration of the geometric parameters of the graphic elements, wherein the topology is recognized using the connection parameter at said topology recognition step, and wherein error information is outputted at said error information output step, in a case where an alteration of geometric parameters exceeds the maximum amount of alteration of the geometrical parameters at said geometric-parameter alteration step.

5. The method according to claim 3, wherein at said geometric-parameter alteration step, alteration of the geometric parameter of graphic elements other than line segments is performed prior to alteration of the geometric parameter of line segments.

6. The method according to claim 3, wherein at geometric-parameter alteration step, the alteration of geometric parameters is performed with regard to graphic elements other than the graphic elements indicated by the error information outputted at said error information output step.

7. A system for creating graphics comprising a plurality of graphic elements, said system comprising:

storage means for storing, at least, a connection parameter usable to obtain geometric parameters of each graphic element and connected states between graphic elements, and a maximum amount of alteration of geometric-parameters;

topology recognition means for recognizing the topology of the graphic elements based upon the geometric parameters and the connection parameter;

geometric-parameter alteration means for correcting offset between graphic elements by altering the geometric parameters of necessary graphic elements, within the maximum amount of alteration of geometric-parameters, while maintaining the topology; and end-point decision means for deciding end points of each graphic element based upon the altered geometric parameters.

8. The system according to claim 7, further comprising input means for entering the geometric parameter.

9. The system according to claim 7, wherein said geometric-parameter alteration means performs the alteration of geometric parameters of graphic elements other than line segments prior to alteration of geometric parameters of the line segments.

10. The system according to claim 9, wherein said geometric-parameter alteration means includes:

error decision means for judging that an alteration error has occurred in a case where an amount of alteration is greater than said maximum amount of alteration; and error alerting means for alerting of error information.

11. The system according to claim 10, wherein when said error decision means has judged that a certain graphic element has undergone an alteration error, said geometric-parameter alteration means ignores this graphic element and alters the geometric parameters of another graphic element.

12. The system according to claim 10, wherein when said error decision means has judged that a certain graphic element has undergone an alteration error, said error alerting means provides information indicative of this graphic element.

* * * * *

UNITED STATES PATENT AND TRADEMARK OFFICE
CERTIFICATE OF CORRECTION

PATENT NO. : 5,506,948
DATED : April 9, 1996
INVENTOR(S) : MIYUKI ONITAKE ET AL.

It is certified that error appears in the above-indentified patent and that said Letters Patent is hereby corrected as shown below:

On the title page item [57], line 2,

"metric data-element" should read --metric-element--.

COLUMN 1

Line 27, "adopts" should read --adopt--.

COLUMN 4

Line 37, "off" should read --of--.

COLUMN 6

Line 26, "segment 5." should read --segment 75.--.

COLUMN 7

Line 36, "present" should read --the present--.

COLUMN 8

Line 47, "at" should read --at said--.

UNITED STATES PATENT AND TRADEMARK OFFICE
CERTIFICATE OF CORRECTION

PATENT NO. : 5,506,948
DATED : April 9, 1996
INVENTOR(S) : MIYUKI ONITAKE ET AL.

Page 2 of 2

It is certified that error appears in the above-indentified patent and that said Letters Patent is hereby corrected as shown below:

COLUMN 9

Line 5, "parameter." should read --parameters.--.

Signed and Sealed this

Seventeenth Day of September, 1996

Attest:

BRUCE LEHMAN

Attesting Officer

Commissioner of Patents and Trademarks